H. E. COFFIN.
SPEED CONTROL MECHANISM FOR MOTOR VEHICLES.
APPLICATION FILED JULY 18, 1907.
1,059,526.
Patented Apr. 22, 1913.
3 SHEETS—SHEET 1.
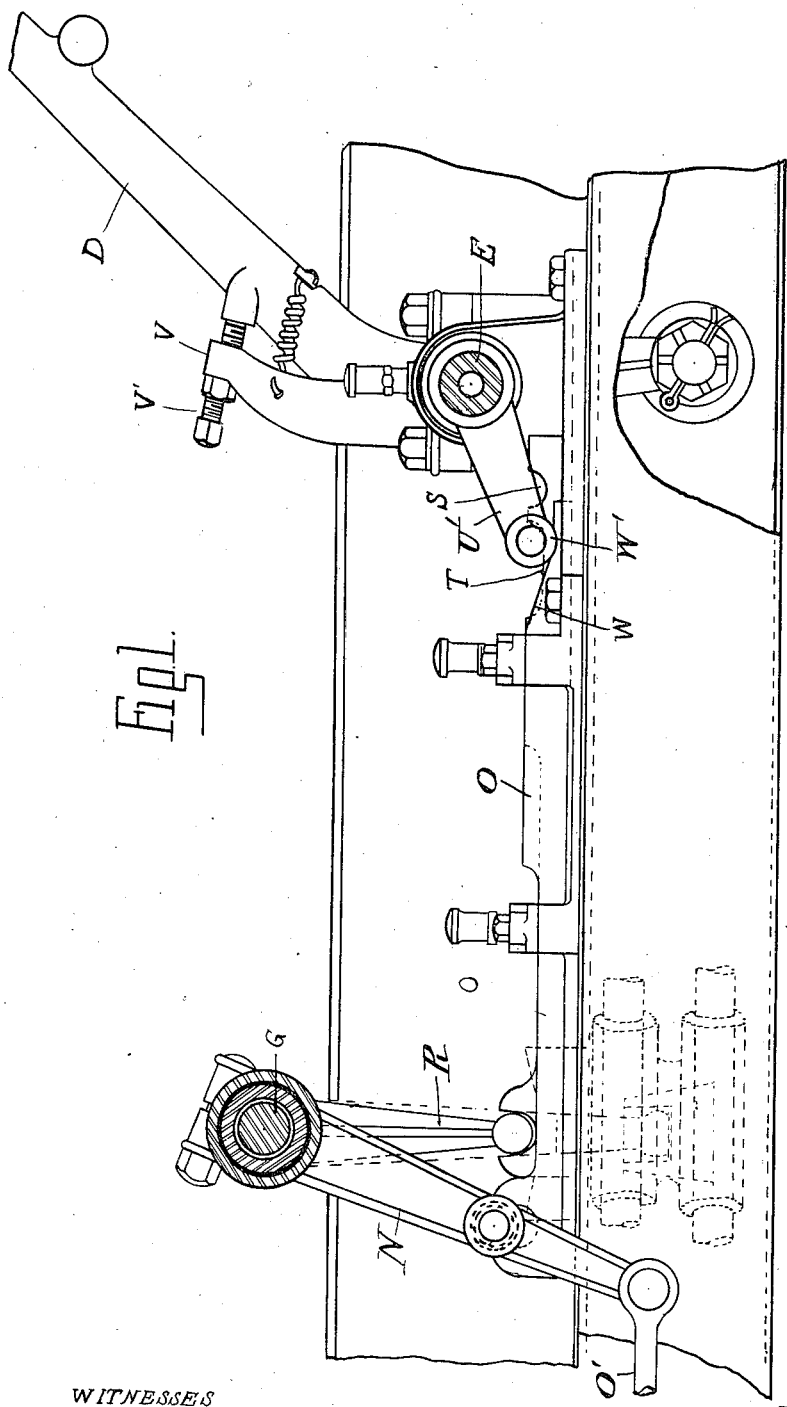
WITNESSES
INVENTOR
Howard E. Coffin

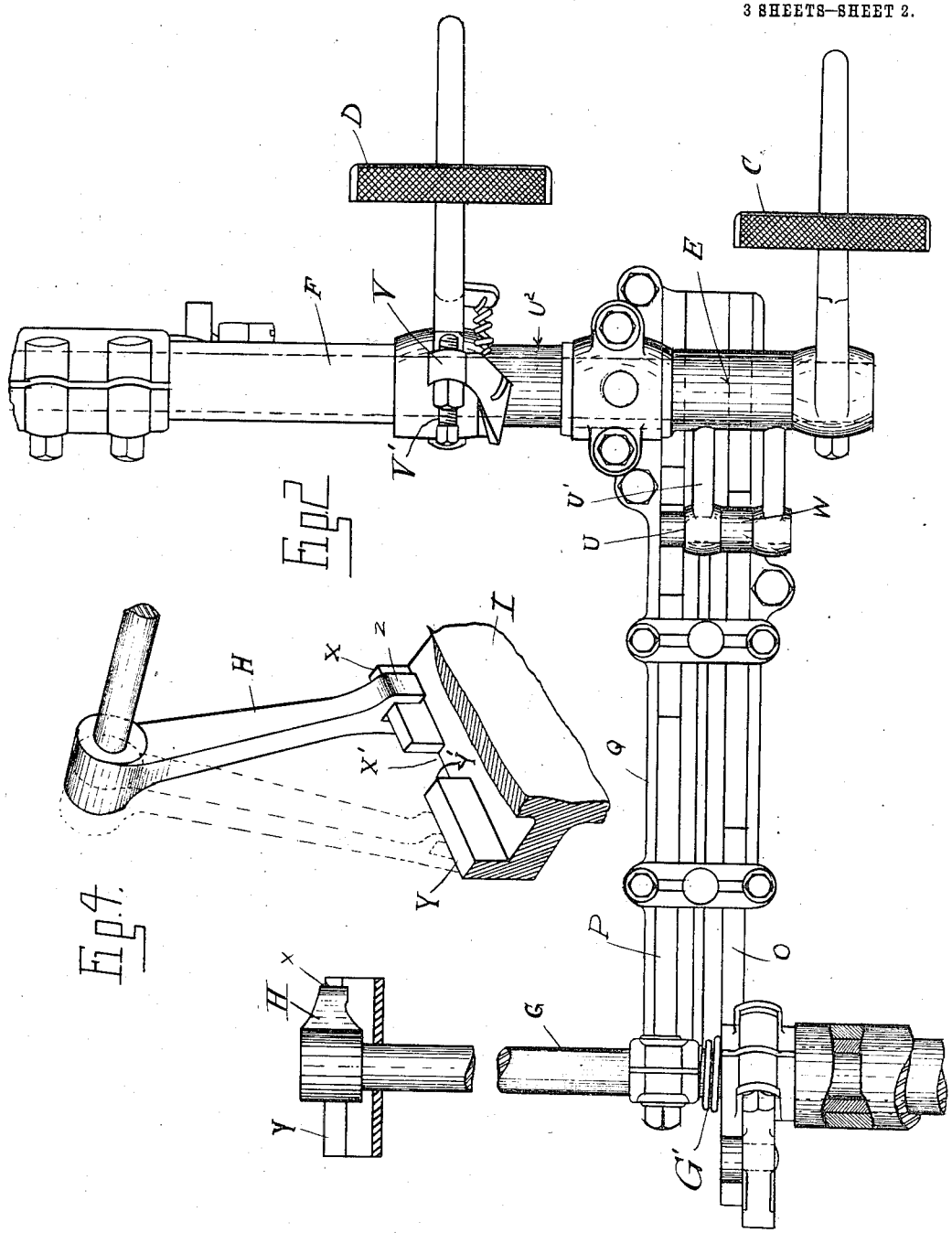

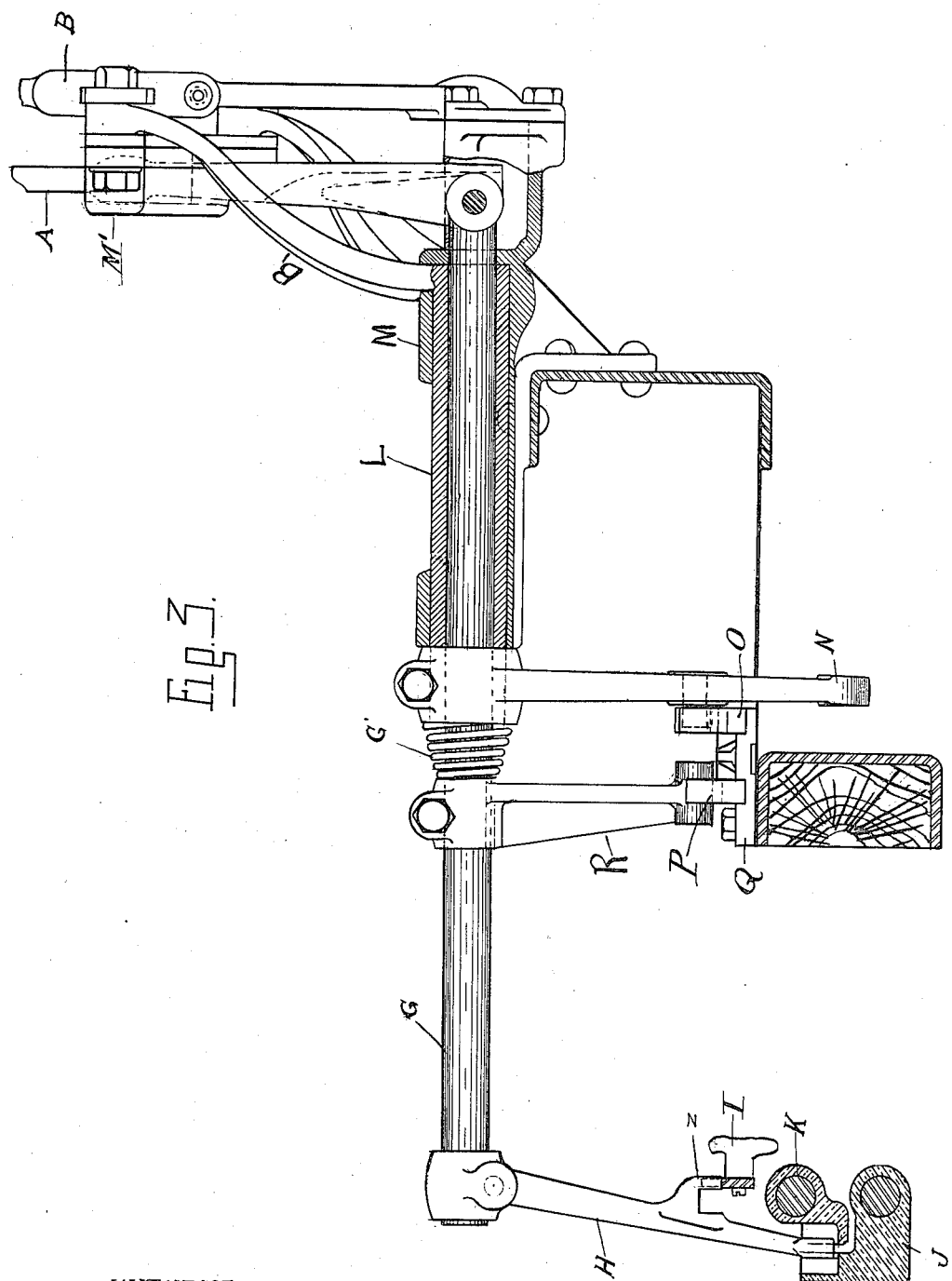

UNITED STATES PATENT OFFICE.

HOWARD E. COFFIN, OF DETROIT, MICHIGAN, ASSIGNOR TO CHALMERS MOTOR COMPANY, OF DETROIT, MICHIGAN, A CORPORATION OF MICHIGAN.

SPEED-CONTROL MECHANISM FOR MOTOR-VEHICLES.

1,059,526.     Specification of Letters Patent.     Patented Apr. 22, 1913.

Application filed July 18, 1907. Serial No. 384,301.

*To all whom it may concern:*

Be it known that I, HOWARD E. COFFIN, a citizen of the United States of America, residing at Detroit, in the county of Wayne and State of Michigan, have invented certain new and useful Improvements in Speed-Control Mechanism for Motor-Vehicles, of which the following is a specification, reference being had therein to the accompanying drawings.

The invention relates to the control mechanism for motor vehicles, and consists in certain novel features of construction as hereinafter set forth.

In the drawings—Figure 1 is a sectional side elevation; Fig. 2 is a plan view; and Fig. 3 is a vertical cross section, and Fig. 4 is a perspective view of a portion of the mechanism.

My improved control mechanism is of the type provided with two hand controlled levers A and B, the principal function of the former being to shift the gears of the transmission mechanism, and the latter to set the brakes and control the main clutch. Pedals C and D are also provided for respectively operating a brake and throwing out the main clutch. The pedal C is directly mounted upon a transversely extending brake shaft E, and the pedal D is secured to a rock sleeve F for operating the clutch, not shown. The lever A is connected to operate a rock shaft G and is adapted both to rock the shaft and to move the same longitudinally.

H is a rock arm secured to the shaft, and extending downward into the casing I inclosing the transmission mechanism and into operative relation to the gear shifting slides J and K, the arrangement being such that a longitudinal movement of the shaft G will shift said arm H from engagement with one of said slides into engagement with the other, while the rocking of the shaft will operate the slide with which the arm is engaged. The lever B is connected to a sleeve L surrounding the shaft G and together therewith mounted in a bearing M upon the frame. This sleeve has secured thereto the rock arm N, which is connected to a rod O' for operating the brake. In addition to this connection, the lever B controls the main clutch through mechanism to be hereinafter described.

Heretofore, mechanisms of the type above described have been provided with automatic locking devices, which prevent the operation of the gear shifting lever A when the lever B is in certain positions of adjustment, as, for instance, where it is adjusted to engage the main clutch.

It is one of the objects of the present invention to provide a simple and positive construction of locking mechanism for this purpose, and also one which will permit of such adjustment of the gears as can be safely effected when the main clutch is engaged; for instance, it is always safe to throw out the gears if they are locked from reëngagement at a different speed. My mechanism is therefore so constructed as to permit the throwing out of the gears when the machine is running at either high or low speed, while preventing the further adjustment of the lever which would throw in the intermediate speed or reverse without first disengaging the clutch.

My improved locking mechanism comprises a pair of slides O and P, arranged parallel to each other, and extending between the rock shafts E and G at one side of the frame. These slides are mounted in suitable ways or bearings Q, rigidly secured to the frame of the machine, and the rear ends of the slides are in engagement respectively with the rock arm N on the sleeve L and a rock arm R on the shaft G. The forward end of the slide P is provided with adjacent notches S and T for alternative engagement with a detent U on a rock arm U' secured to a sleeve U² on the shaft E. This sleeve U² is connected to the sleeve F through the medium of an adjustable connection, consisting of the arm V and set screw V', which bears against the pedal D. Thus the shifting of the slide P longitudinally is prevented whenever the detent U is in engagement with the notch S, and the complete shifting of the slide is also prevented when said detent U is in engagement with the notch T. The latter notch is, however, elongated sufficiently to permit an adjustment of the slide. The other slide O is provided with a cam W for engaging a bearing W' also on the rock arm U' and for rocking said arm so as to lift the detent U out of engagement with the notches S or T. This rocking of the arm U' also causes the rocking of the sleeve U² and, through the medium of the connection V V', rocks the sleeve F to throw out the main clutch.

With the construction as above described, when the lever B is in its neutral position the cam W will be withdrawn from the bearing W' permitting the rock arm U' and detent U thereon to assume a position of engagement with one or the other of the notches S and T in the slide P. If the lever A is in its neutral position, or is adjusted for high speed, the detent U will engage the notch T. If, on the other hand, the lever A is in a position for intermediate speed or reverse, the detent U will be engaged with the notch S, and will lock the slide P from any shifting whatsoever. Thus is would be impossible for the operator to shift the lever A from this latter adjustment without first shifting the lever B from its neutral position to a position where it will disengage the clutch through the medium of the cam W, bearing W' rock arm U', and other connections previously described. It will be observed, however, that when the lever A is adjusted for high or slow speeds (both of which are controlled by the rocking of the lever in the same direction but in different positions of longitudinal adjustment of the shaft G), a limited movement of the slide P is permitted by the elongated notch T, and this is sufficient to allow the gears to be disengaged.

As has been stated, the arm H on the rock shaft G is alternatively engaged with the slides J and K by the longitudinal shifting of said rock shaft. This longitudinal shifting is effected, in the construction shown, by attaching the lever to the shaft, so as to pivot it in the plane of the shaft, and by forming a fulcrum bearing for the lever on the segment M' therefor. The longitudinal shifting of the shaft must be effected when the lever A is in its neutral position, and to compel this stop, flanges X and Y are arranged preferably on the wall of the transmission casing and engage with a finger Z on the rock arm H. These flanges X and Y are in substantial alinement with each other, with an intervening space X', through which the finger Z is permitted to pass when in registration therewith, this being when the lever is in its neutral position. The finger is also formed so as to be adjustable longitudinally on either side of the flanges X and Y, and thus in either position of longitudinal adjustment of the shaft G the rocking of the lever A is permissible, but in an intermediate position of longitudinal adjustment of the shaft the lever is locked from rocking. The construction of the transmission is preferably such that the high and intermediate speeds are respectively thrown in when the slide J is at opposite ends of its adjustment, and this slide can only be adjusted when the rock shaft G is shifted longitudinally inward, and the finger Z is upon the inner side of the flanges X and Y. On the other hand, the slide K, when adjusted in opposite directions respectively throws in the slow speed and the reverse, and this adjustment is possible only when the shaft G is longitudinally shifted outward, and the finger Z is on the outer side of the flanges X and Y. Thus a rocking of the lever A, through its entire range of angular adjustment, will in one position of longitudinal adjustment pass from slow to reverse, and in the other position of longitudinal adjustment from high to intermediate. Any other adjustment of the lever necessitates a longitudinal adjustment while in neutral angular position and the passage of the finger Z through the slot X' between the flanges X and Y.

It is desirable to prevent the accidental angular shifting of the lever over the neutral point, especially in passing from slow to reverse. This is accomplished by off-setting the flanges X and Y in relation to each other, so as to form a stop shoulder Y', which lies in the direct path of the finger Z, and to be avoided compels a slight longitudinal shifting of the shaft when the lever is in neutral angular position.

To further avoid the accidental throwing in of the reverse, I provide means, such as a spring G' upon the shaft G for automatically shifting said shaft inward whenever the finger Z is in registration with the slot X'. Thus, if the operator shifts the lever A from position of slow speed, as soon as the neutral point is reached the spring G' will longitudinally shift the shaft, so that a further angular adjustment of the lever will throw in the intermediate speed and not the reverse. If the operator desires to throw in the reverse, he must do this by a movement of the lever contrary to the tension of the spring G' and at sufficient distance to avoid the shoulder Y' on the flange Y. As the passage from slow speed to reverse is less frequently desired than the passage from slow to intermediate, this construction of mechanism facilitates the operation.

What I claim as my invention is:

1. A control mechanism for motor vehicles comprising a plurality of control levers, concentric rock shafts respectively connected to said levers, rock arms on said rock shafts, parallel slides actuated by said rock arms, a rock arm operated by one of said slides in a direction transverse to the plane of movement of said slides, mechanism controlled by said rock arm, a detent carried by said rock arm, and the other slide having a plurality of notched bearings for engagement with said detent, one of said bearings being elongated to permit a limited movement of the slide.

2. In a control mechanism for motor vehicles, the combination with a vehicle frame and a plurality of control levers fulcrumed thereon, of parallel slides mounted upon the side sill of said frame and respectively actuated by said levers, and a rock shaft actuated by one of said slides controlling the locking of the other slide.

3. In a control mechanism, a lever angularly adjustable in different planes and laterally adjustable from one plane to another, means for confining said lever to one or the other of its planes when out of its neutral position of adjustment, a fixed stop for preventing angular movement in the same plane from one side to the other of said neutral position of adjustment, and means for yieldably forcing said lever when in its neutral position toward one of its planes.

4. In a control mechanism, a lever angularly adjustable in different planes and laterally adjustable from one plane to another, means for confining said lever to one plane when out of its neutral position, a fixed stop preventing the angular adjustment of said lever from one side to the other of its neutral position while in the same plane, said stop being avoidable by lateral movement of the lever in one direction, and means for yieldably forcing said lever in the opposite direction and toward a different plane of angular adjustment.

5. In a control mechanism, a lever angularly adjustable in different planes and laterally adjustable from one plane to another, separate mechanisms operated by said lever when in different planes of adjustment, a guide for confining said lever to one plane, excepting when in its intermediate neutral position of adjustment, and having a slot for permitting lateral adjustment of the lever when in said neutral position, said guide being off-set on opposite sides of said slot to prevent angular movement of the lever from one side to the other in the same plane.

6. In a control mechanism, the combination with a lever angularly adjustable in different planes and laterally adjustable from one plane to the other, separate mechanisms operated by said lever when in different positions of adjustment, a rock shaft adjusted rotatively and axially by the respective adjustments of said lever, a rock arm on said rock shaft for alternative engagement with the different mechanisms when said lever is in different planes of adjustment, a finger on said rock arm, a guide for engaging said finger and holding said lever in one or the other of its planes when said finger is upon opposite sides of said guide, said guide having a slot with which said finger is registered in the neutral position of said lever, and a spring for yieldably pressing said rock shaft, lever and arm in one direction when said finger is in registration with said slot.

7. In a control mechanism, the combination with a rock shaft and means for operating the same, of a rock arm, a casing having flanges slightly spaced from one another at the lower end of said arm, one of said flanges being off-set to form a stop in the path of the rock arm while in engagement with the other flange, said rock arm being longitudinally adjustable on either side of said flanges.

8. In a control mechanism the combination with a rock shaft and means for operating the same, of a rock arm, a casing having flanges slightly spaced from one another at the lower end of said arm, one of said flanges being of greater cross-section than the other forming a stop in the path of the rock arm while in engagement with the other flange, said rock arm being longitudinally adjustable on either side of said flanges.

9. A control mechanism comprising a plurality of levers, parallel slides connected for actuation respectively by said levers, a rock arm actuated by one of said slides, a detent on said rock arm for locking another slide, a rock shaft operated by said rock arm, and mechanism operated by said rock shaft.

10. A control mechanism comprising a plurality of levers, parallel slides actuated respectively by said levers, one of said slides having a cam face, a rock arm actuated by said cam face slide, a detent carried by said rock arm, another slide having means for engaging said detent in different positions of adjustment of said slide, a rock shaft actuated by said rock arm, and mechanism operated by said rock shaft.

11. A control mechanism comprising a plurality of levers, parallel slides connected for actuation respectively by said levers, a rock arm actuated by one of said slides, a detent on said rock arm for locking another slide, a rock shaft operated by said rock arm, a second member adapted to be actuated upon the operation of the rock arm, and mechanisms controlled respectively by said rock shaft and second member.

12. A control mechanism comprising a plurality of levers, parallel slides connected for actuation respectively by said levers, a rock arm actuated by one of said slides, a detent on said rock arm for locking another slide, a rock shaft actuated by said rock arm, mechanism operated by said shaft, and means for operating the rock shaft independently of the slides.

13. In a control mechanism, the combination with two rockable members, of levers for respectively controlling said members, means for rocking both of said members upon the actuation of one of the levers, a third lever, and means controlled by said last-mentioned lever for simultaneously operating both of said rockable members.

14. In a control mechanism, the combination with a plurality of parallel slides, a movable detent, one of said slides having a plurality of bearings for engaging the detent in different positions of adjustment of said slide, engagement with one of said bearings being adapted to lock the slide from movement and engagement with another of said bearings permitting a limited movement, a lever for actuating the last-mentioned slide, means actuated by another slide for engaging and disengaging said detent from its coöperating bearings, and a second lever for operating the last-mentioned slide.

In testimony whereof I affix my signature in presence of two witnesses.

HOWARD E. COFFIN.

Witnesses:
 AMELIA WILLIAMS,
 NELLIE KINSELLA.